United States Patent
Hong et al.

(10) Patent No.: US 8,225,487 B2
(45) Date of Patent: Jul. 24, 2012

(54) METHOD FOR CONFINING SENSE CURRENT OF A READ TRANSDUCER TO AN AIR-BEARING SURFACE(ABS) SIDE OF A FREE LAYER

(75) Inventors: Ying Hong, Morgan Hill, CA (US); Edward Hin Pong Lee, San Jose, CA (US); Aron Pentek, San Jose, CA (US); David John Seagle, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1033 days.

(21) Appl. No.: 12/180,313

(22) Filed: Jul. 25, 2008

(65) Prior Publication Data

US 2010/0021764 A1   Jan. 28, 2010

(51) Int. Cl.
*G11B 5/127* (2006.01)
*H04R 31/00* (2006.01)

(52) U.S. Cl. ............... 29/603.16; 29/603.13; 29/603.14; 29/603.15; 29/603.18; 216/62; 216/65; 216/66; 360/324.1; 360/324.11; 360/324.12; 360/324.2; 451/5; 451/41

(58) Field of Classification Search .. 29/603.13–603.16, 29/603.18; 216/62, 65, 66; 360/324.1, 324.11, 360/324.12, 324.2; 451/5, 41
See application file for complete search history.

(56) References Cited

U.S. PATENT DOCUMENTS

| | | | |
|---|---|---|---|
| 6,609,948 B1 | 8/2003 | Fontana, Jr. et al. | 451/5 |
| 7,027,274 B1 | 4/2006 | Sin et al. | 360/324.2 |
| 7,057,863 B2 | 6/2006 | Cyrille et al. | 360/324.12 |
| 7,061,728 B2 | 6/2006 | Pinarbasi | 360/320 |
| 7,194,797 B2 | 3/2007 | Pinarbasi | 29/603.14 |
| 7,207,098 B2 | 4/2007 | Yin et al. | 29/603.12 |
| 7,333,305 B2 | 2/2008 | Gill | 360/324.12 |
| 7,530,158 B2 * | 5/2009 | Araki et al. | 29/603.07 |
| 7,639,456 B2 * | 12/2009 | Hong et al. | 360/324.1 |
| 2003/0193756 A1 | 10/2003 | Kudo et al. | 360/313 |
| 2004/0064934 A1 | 4/2004 | Nemoto | 29/603.13 |
| 2006/0018056 A1 | 1/2006 | Sato | 360/322 |
| 2006/0101636 A1 * | 5/2006 | Cyrille et al. | 29/603.15 |
| 2007/0035887 A1 | 2/2007 | Freitag et al. | 360/324 |
| 2007/0035891 A1 | 2/2007 | Freitag et al. | 360/324.11 |
| 2008/0274623 A1 * | 11/2008 | Guthrie et al. | 438/712 |

* cited by examiner

*Primary Examiner* — Paul D Kim
(74) *Attorney, Agent, or Firm* — Zilka-Kotab, PC

(57) ABSTRACT

A method according to one embodiment includes forming a mask above a thin film sensor stack; forming an electrically insulating layer above the mask and sensor stack, the insulating layer having a portion extending along a nonhorizontal end of the mask; selectively removing the insulating layer except for the portion thereof extending along the nonhorizontal end of the mask; removing portions of the sensor stack that are not covered by the mask and the portion of the insulating layer, wherein an end of the portion of the insulating layer positioned away from the mask is about aligned with a back end of the sensor stack after removing the portions thereof; and removing the mask.

14 Claims, 8 Drawing Sheets

METHOD FOR CONFINING SENSE CURRENT OF A READ TRANSDUCER TO AN AIR-BEARING SURFACE(ABS) SIDE OF A FREE LAYER

FIELD OF THE INVENTION

The present invention relates to magnetic sensors, and more particularly, this invention relates to current perpendicular-to-plane (CPP) magnetic sensors.

BACKGROUND OF THE INVENTION

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

SUMMARY OF THE INVENTION

A method in one embodiment includes forming a mask above a thin film sensor stack; forming an electrically insulating layer above the mask and sensor stack, the insulating layer having a portion extending along a nonhorizontal end of the mask; selectively removing the insulating layer except for the portion thereof extending along the nonhorizontal end of the mask; removing portions of the sensor stack that are not covered by the mask and the portion of the insulating layer, wherein an end of the portion of the insulating layer positioned away from the mask is about aligned with a back end of the sensor stack after removing the portions thereof; and removing the mask.

A method in another embodiment includes forming a thin film sensor stack having an ABS region positioned along a future location of an air bearing surface of a sensor having the sensor stack, a back region positioned towards a future location of a back end of the sensor opposite the air bearing surface of the sensor, and an upper surface extending across the ABS and back regions; forming an electrically insulating layer above the upper surface of the sensor stack, the electrically insulating layer extending along the back region of the sensor but not along the ABS region; removing portions of the sensor stack using the insulating layer as a mask, thereby defining the back end of the sensor stack; and forming an electrically conductive layer above the ABS region of the sensor stack, the electrically conductive layer being in electrical communication with the sensor stack.

A sensor in yet another embodiment includes a thin film sensor stack having an ABS end positioned towards an air bearing surface of the sensor, a back end opposite the ABS end, and a surface extending between the ABS and back ends; an electrically insulating layer extending along only a portion of the surface and being about aligned with the back end; and a conductive layer extending along the surface of the sensor stack, the conductive layer lying on a common plane with the insulating layer, wherein a thickness of the insulating layer is greater than a thickness of the conductive layer.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

The following description discloses several preferred embodiments of magnetic storage systems, as well as operation and/or component parts thereof.

In one general embodiment, a method comprises a forming a mask above a thin film sensor stack; forming an electrically insulating layer above the mask and sensor stack, the insulating layer having a portion extending along a nonhorizontal end of the mask; selectively removing the insulating layer except for the portion thereof extending along the nonhorizontal end of the mask; removing portions of the sensor stack that are not covered by the mask and the portion of the insulating layer, wherein an end of the portion of the insulating layer positioned away from the mask is about aligned with a back end of the sensor stack after removing the portions thereof; and removing the mask.

In another general embodiment, a method comprises forming a thin film sensor stack having an ABS region positioned along a future location of an air bearing surface of a sensor having the sensor stack, a back region positioned towards a future location of a back end of the sensor opposite the air bearing surface of the sensor, and an upper surface extending across the ABS and back regions; forming an electrically insulating layer above the upper surface of the sensor stack, the electrically insulating layer extending along the back region of the sensor but not along the ABS region; removing portions of the sensor stack using the insulating layer as a mask, thereby defining the back end of the sensor stack; and forming an electrically conductive layer above the ABS region of the sensor stack, the electrically conductive layer being in electrical communication with the sensor stack.

In another general embodiment, a sensor comprises a thin film sensor stack having an ABS end positioned towards an air bearing surface of the sensor, a back end opposite the ABS end, and a surface extending between the ABS and back ends; an electrically insulating layer extending along only a portion of the surface and being about aligned with the back end; a conductive layer extending along the surface of the sensor stack, the conductive layer lying on a common plane with the insulating layer; wherein a thickness of the insulating layer is greater than a thickness of the conductive layer.

Figure 1:
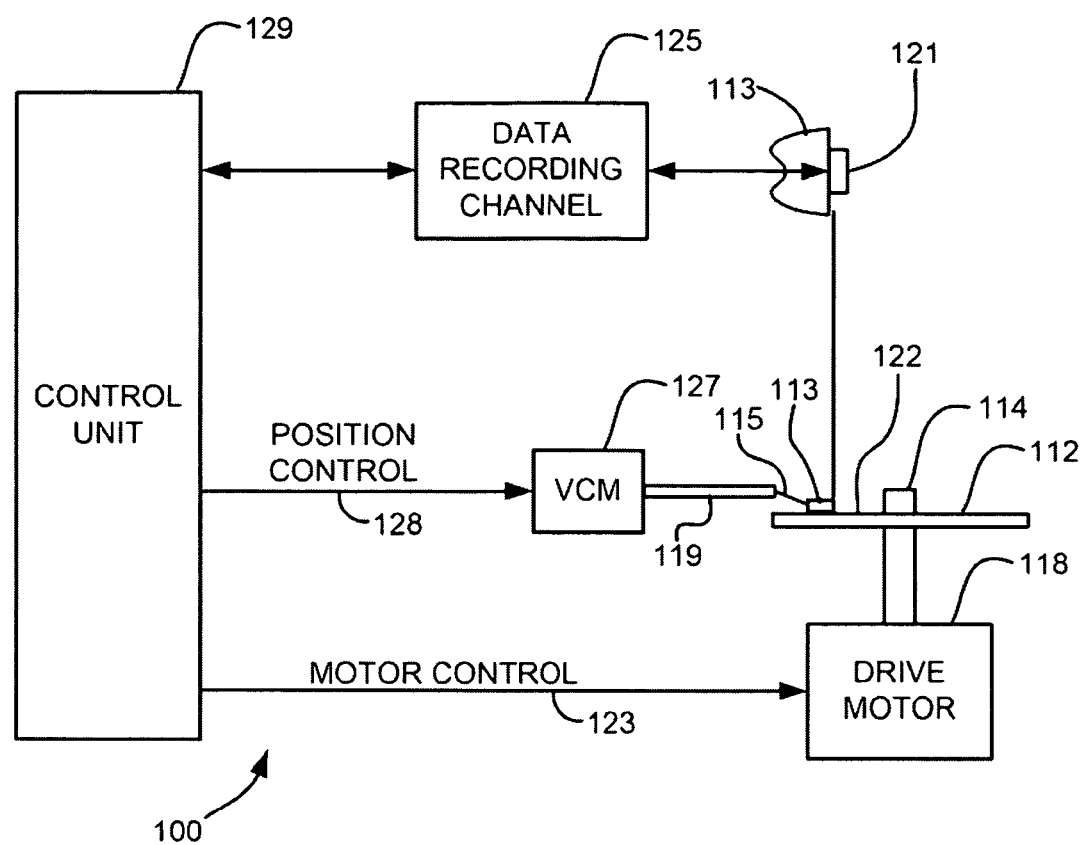
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is in the form of an annular pattern of concentric data tracks (not shown) on the disk 112.

At least one slider 113 is positioned near the disk 112, each slider 113 supporting one or more magnetic read/write heads 121. As the disks rotate, slider 113 is moved radially in and out over disk surface 122 so that heads 121 may access different tracks of the disk where desired data are recorded. Each slider 113 is attached to an actuator arm 119 by means of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

A typical head includes a reader and a writer. Typical writers are inductive and either perpendicular or longitudinal by design. The particular design is chosen to match the media type chosen for the drive. During writing, magnetic fields emanate from the writer at the air bearing surface (ABS) for the purpose of writing bits of magnetic field information in tracks on moving media, such as in circular tracks on a rotating magnetic disk. During readback, the reader is affected by the magnetic field information on the media, thereby allowing readback of the data.

In other approaches, the reader and writer may be on different heads.

Figure 5:
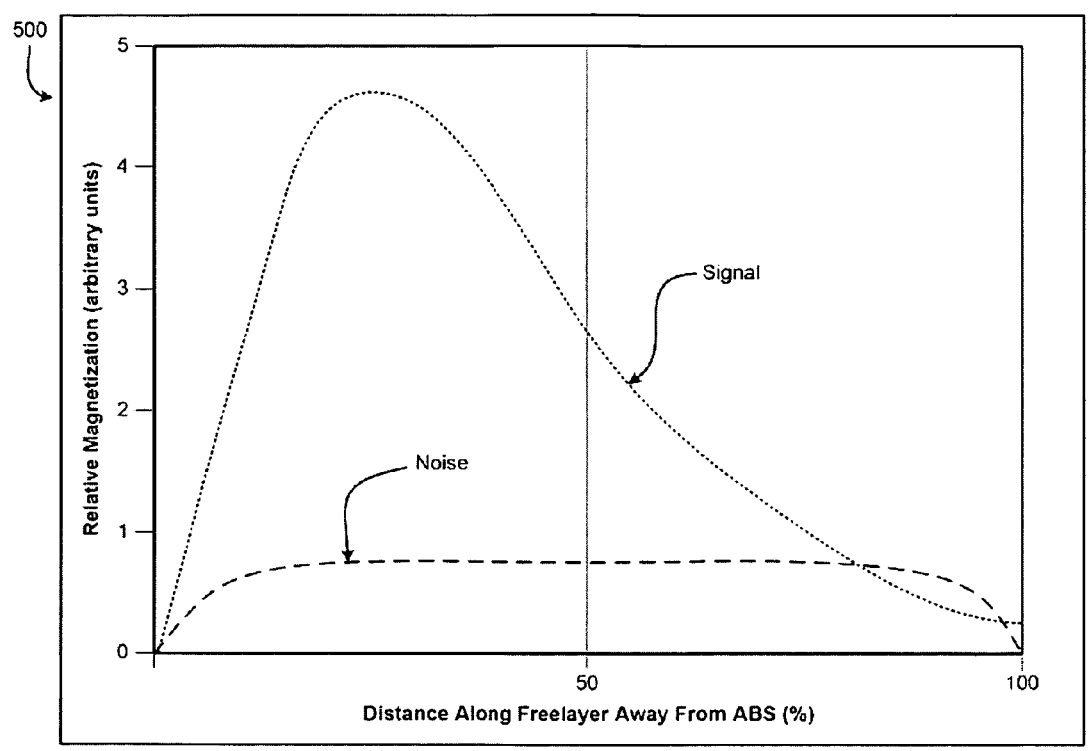
FIG. 5 is a simplified graph depicting Relative Magnetization in arbitrary units versus Distance Along the Freelayer Away From ABS in percent.

FIG. 5 is a simplified graph depicting Relative Magnetization in arbitrary units versus Distance Along the Freelayer Away From ABS in percent. As graph 500 shows, noise strength stays substantially constant in the central portion of graph 500, while the signal strength is maximized a small distance from the ABS, and then falls farther from the ABS. Therefore, the best region to maximize the signal-to-noise ratio is near the ABS on the far left side of graph 500. Now referring to FIG. 2L, sense current 212 is shown flowing through a sensor 200. If the sense current 212 can be confined toward the ABS side of the sensor 200, then the highest signal-to-noise ratio will be achieved.

Figure 2A:
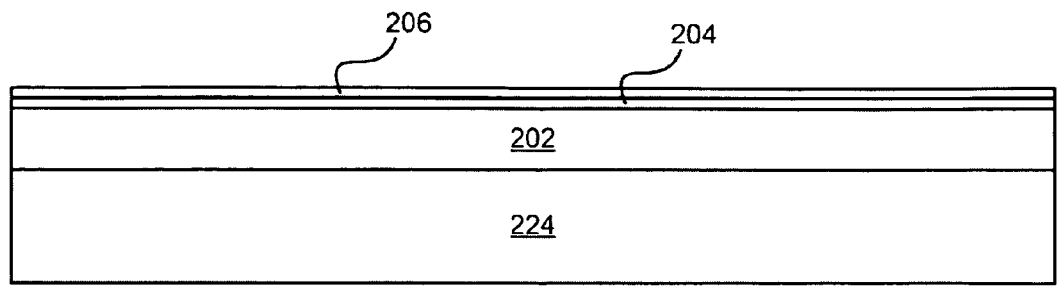
FIGS. 2A-2L are simplified drawings of steps in forming a CPP read sensor which confines sense current to the ABS side of the freelayer.

Now referring to FIGS. 2A-2L, a number of steps are shown in the schematic diagrams illustrating a method for forming a current-perpendicular-to-the-plane (CPP) read sensor which confines sense current to the ABS side of the freelayer, according to one embodiment. Any type of CPP read sensor may be used in conjunction with this method, and tunneling magnetoresistive (TMR) and giant magnetoresistive (GMR) read sensors are preferably used in conjunction with the following methods and systems. In FIG. 2A, a thin film sensor stack 202 is formed above a lower shield 224 (S1). The lower shield 224 is typically used as the lower lead of the read head. The lower shield 224 is typically formed above an undercoat layer (not shown, usually of electrically isolating material) to isolate the lower shield 224 from a substrate (not shown), which the undercoat layer is typically formed above. Above the sensor stack 202, a capping layer 204 (e.g., of a conductive material) is formed. And above the capping layer 204, a first planarization stop layer 206 (e.g., of diamond like carbon (DLC) or other conventional material) is formed.

Figure 2B:
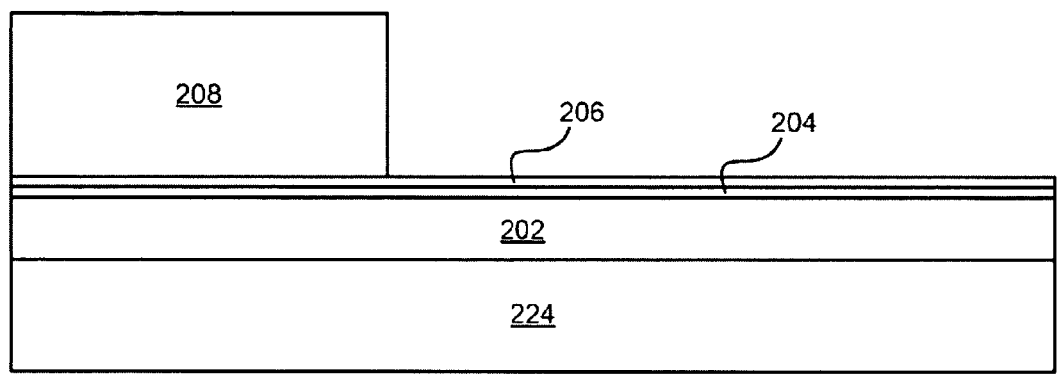

In FIG. 2B, the next step is shown in forming a CPP read sensor which confines sense current to the ABS side of the freelayer. Above a portion of the planarization stop layer 206 which resides on the ABS, a mask 208 (e.g., of photoresist or other masking material) is formed. This layer helps to define the stripe height of the sensor, which is indicated in FIG. 2G as the length α.

Figure 2C:
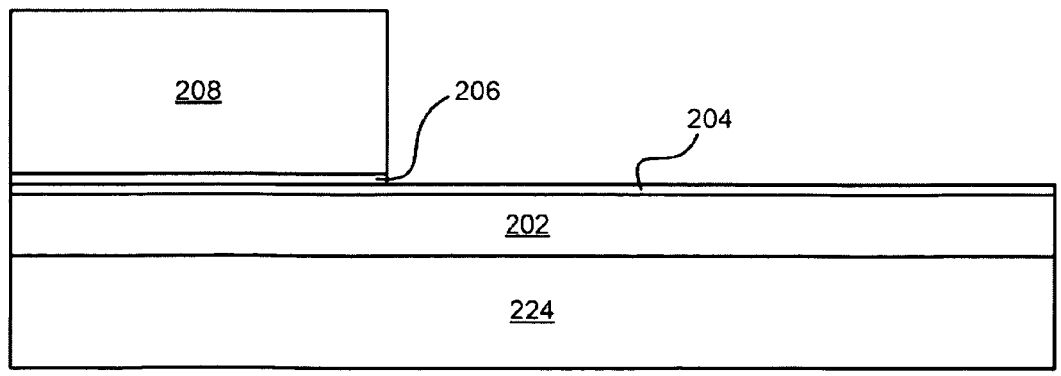

In FIG. 2C, a portion of the planarization stop layer 206 is removed through reactive ion etching (RIE). An illustrative example of this process would probably be in the presence of oxygen to react the material, possibly carbon, in the planarization stop layer 206 with oxygen to form carbon dioxide. This portion of the planarization stop layer 206 is removed to expose a portion of the capping layer 204 which is not below the mask 208.

Figure 2D:
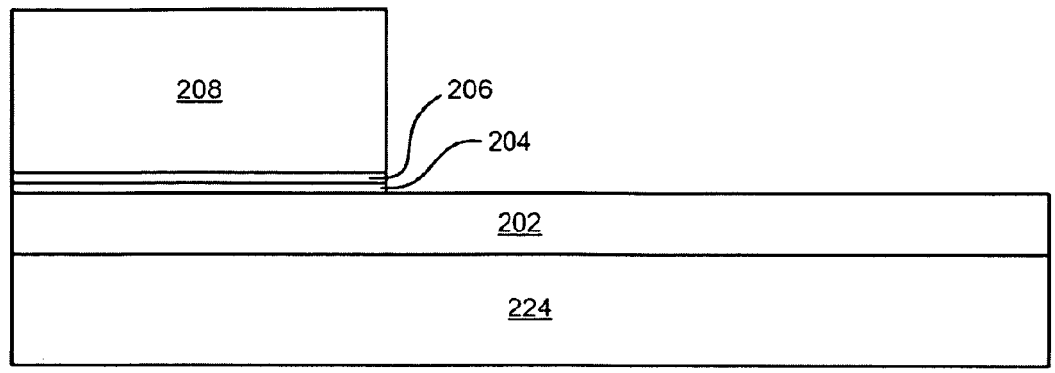

In FIG. 2D, a portion of the capping layer 204 is removed, possibly through a milling process, to expose a portion of the thin film sensor stack 202 which is below the capping layer 204. An endpoint layer (not shown) comprised of a material with a higher atomic weight than the capping layer 204 may be placed between the capping layer 204 and the thin film sensor stack 202 so that a mass spectrometer or other analyzing device or method may be used to determine when the capping layer 204 has been milled out, and the thin film sensor stack 202 is exposed. Also, a capping layer 204 may not be used at all if it is not desired.

Figure 2E:
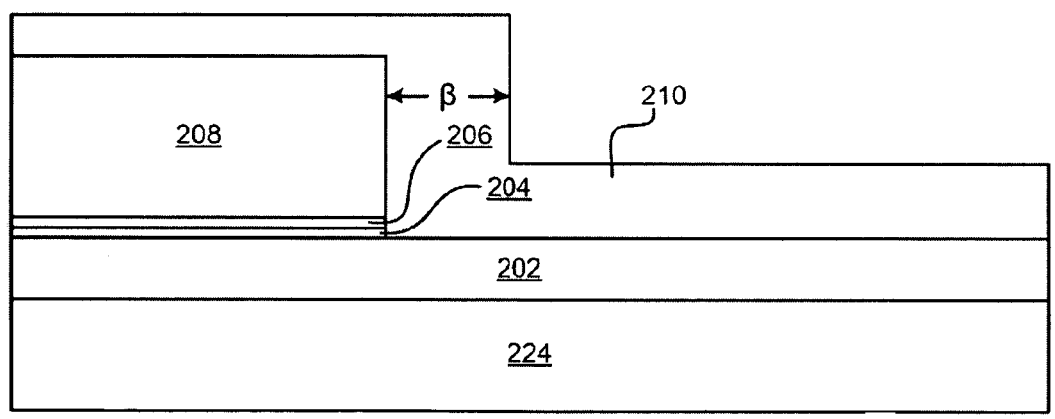

In FIG. 2E, atomic layer deposition (ALD) or other highly conformal deposition technique may be used to form an electrically insulating layer 210 (e.g., of alumina) above the structures already formed. One illustrative ALD process uses organic aluminum in the gas phase. The structures are subjected to the aluminum gas, which forms into a thin layer of aluminum on the surface of the structures. Next, the aluminum is oxidized into alumina in the presence of oxygen. This process is repeated to build thin layer upon thin layer of alumina until the desired thickness of the electrically insulating layer 210 is formed above the structures already in place. Other techniques may be used which can form the alumina layer above the structures already formed, such as sputter coating, CVD, etc., but ALD is the preferred process because it can precisely control the thickness of the alumina formed. The thickness β of this electrically insulating layer 210 is precisely controlled during this step.

Figure 2F:
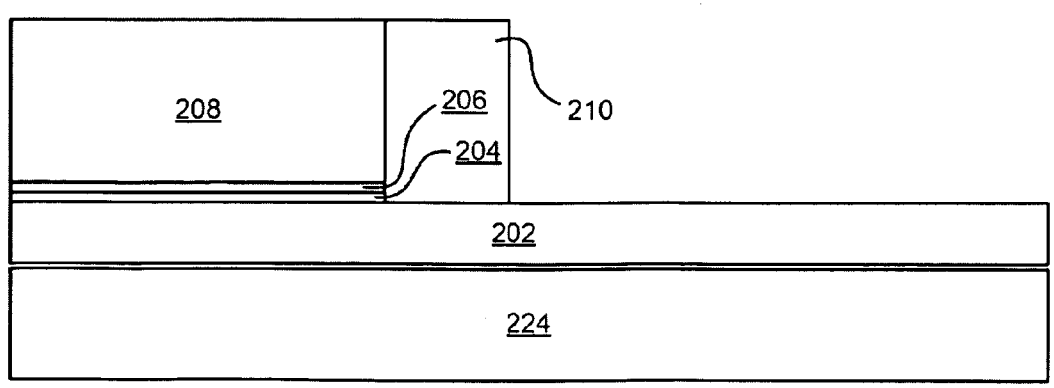
Figure 2G:
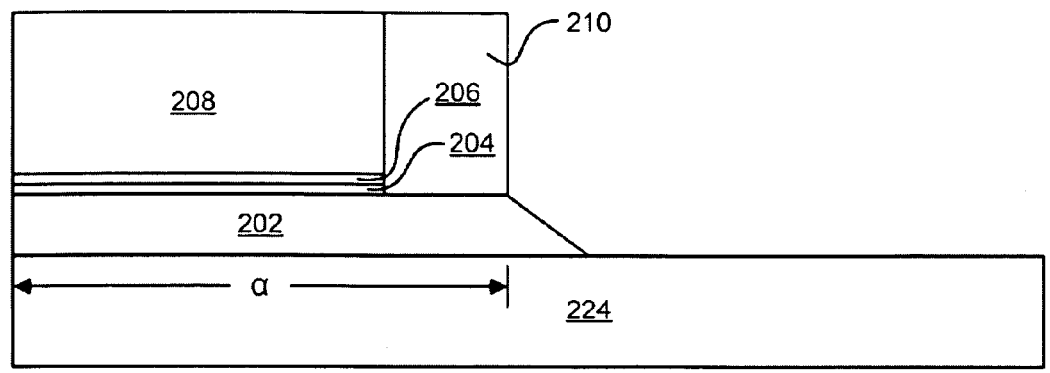

FIG. 2F shows the next step in the process of forming a CPP read sensor which confines sense current to the ABS side of the freelayer. In this step, top down alumina milling is used to remove the portion of the electrically insulating layer 210 which is above the mask 208. Also, the electrically insulating layer 210 is removed by alumina milling from a portion of the thin film sensor stack 202, so that a desired thickness of electrically insulating layer 210 is left beside the mask 208 and above the thin film sensor stack 202.

In FIG. 2G, the result of a sensor mill step is shown. In this step, a portion of the thin film sensor stack 202 is removed, possibly through ion milling, so that the stripe height α of the sensor is defined. The stripe height α is defined as the length of the mask 208 and the electrically insulating layer 210. The thin film sensor stack 202 may be removed at an angle, which can be set depending on the characteristics that are desired of the sensor in the finished CPP read sensor.

Figure 2H:
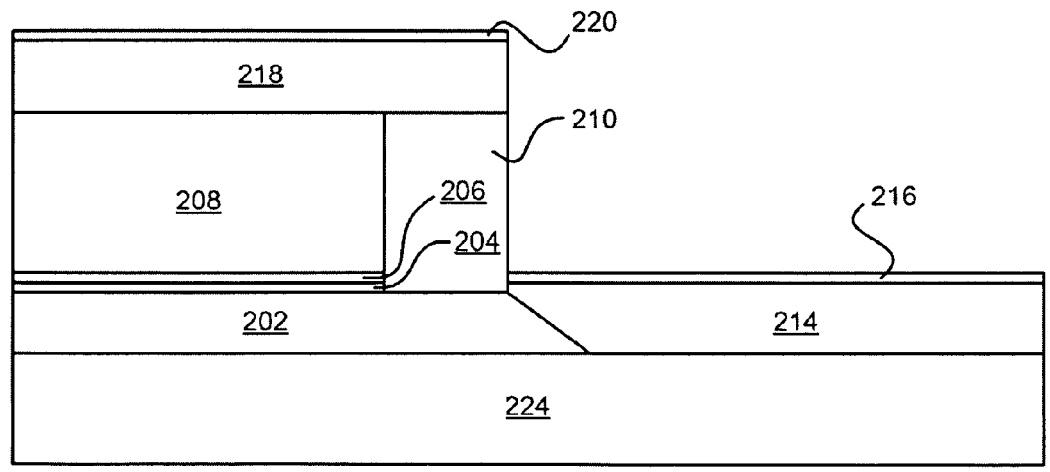

In FIG. 2H, a fill step adds etchable layers 214 and 218 over the structures already in place. For example, an etchable layer 214 may be formed above the lower shield layer, while simultaneously an etchable layer 218 may be formed above the mask 208 and the electrically insulating layer 210. This deposition is preferably an electrical insulator because etchable layer 214 may later act to isolate the top lead from the lower shield on the completed head. Above these etchable layers are planarization stop layers, 216 and 220, which preferably are formed of mechanically hard materials (e.g., carbon) such that planarization stop layer 216 can act as a mechanical stop in a chemical-mechanical planarization (CMP) process. At the same time, the material chosen for these planarization stop layers should be easily removed by another technique, such as RIE. All of these layers may be formed by any conventional methods used in forming thin film layers, such as sputter coating.

Figure 2I:
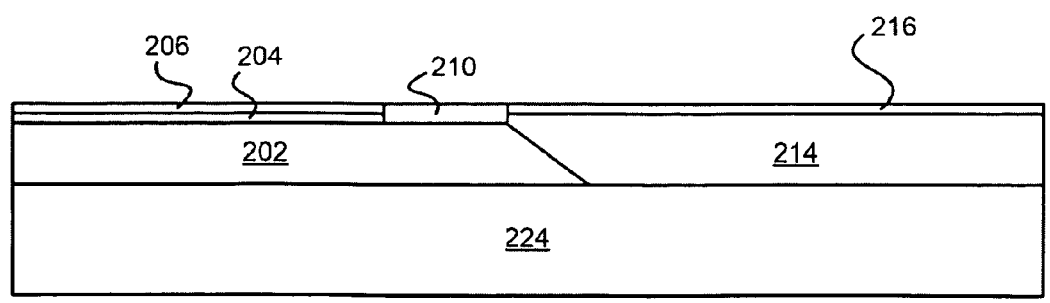

In FIG. 2I, the mask (208, FIG. 2H), the top portion of the electrically insulating layer (210, FIG. 2H), and layers 218 and 220 (FIG. 2H) are removed through CMP so that the planarization stop layers 206 and 216 are exposed. Although etchable layer 220 may be fabricated of the same mechanically hard material as planarization stop layer 216, polishing easily removes etchable layer 220 because it protrudes higher than the surrounding areas creating much greater pressure. The electrically insulating layer (210, FIG. 2H) is not mechanically polished away because it is a small region that is surrounded and supported by stop layers 216 and 206, leaving this portion of electrically insulating material approximately coincident with the tops of stop layers 216 and 206.

Figure 2J:
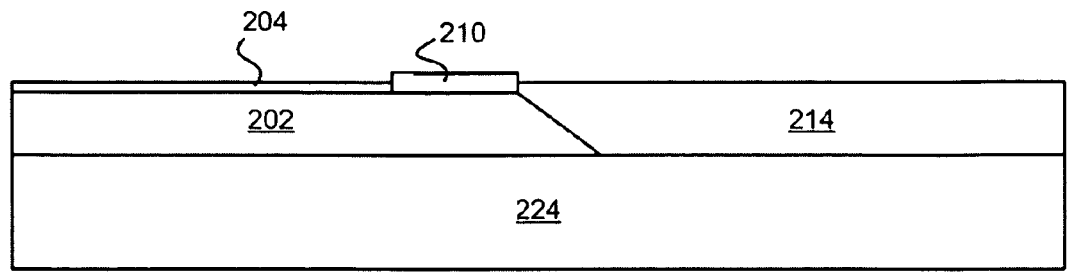

In FIG. 2J, RIE is used to remove planarization stop layer (206, FIG. 2I) and the easily removed layer (216, FIG. 2I), leaving etchable layer 214 and capping layer 204 exposed.

Figure 2K:
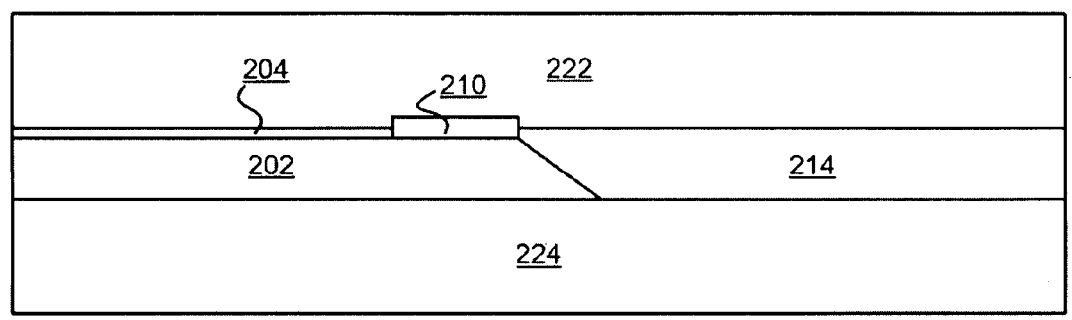

FIG. 2K shows the next step in the process of forming a CPP read sensor which confines sense current to the ABS side of the freelayer. In this step, an upper shield layer 222 (S2) is formed above the structures. Typically, a seed deposition is formed on the structures, and then the shield material is plated onto the seed depositions.

Figure 2L:
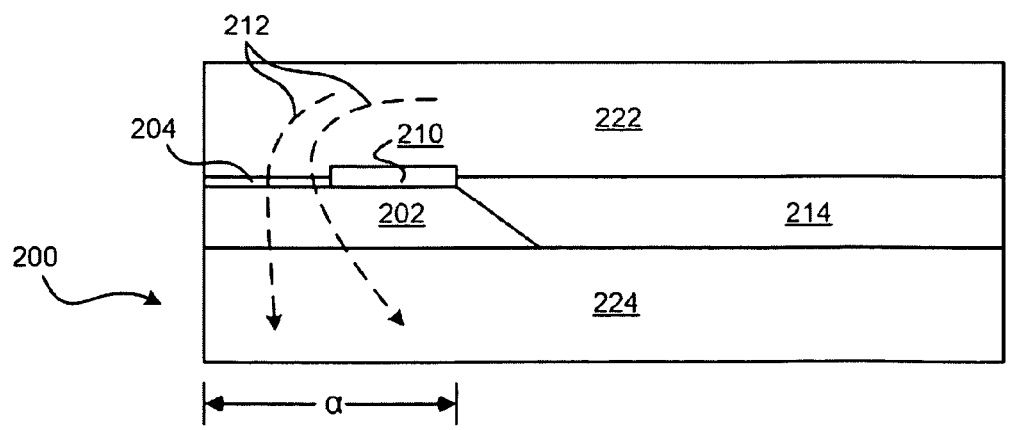

In FIG. 2L, the structure may undergo lapping at the left side, which will be the ABS when the sensor 200 is in operation, to create a desired stack height α. The lines 212 indicate sense current flowing through the sensor.

With continued reference to FIG. 2L, a sensor 200 may be comprised of a thin film sensor stack 202 having an ABS end positioned towards an ABS of the sensor, a back end opposite the ABS end, and a surface extending between the ABS and back ends. The sensor 200 may further be comprised of an electrically insulating layer 210 extending along only a portion of the surface and being about aligned with the back end. Also, the sensor 200 may include a conductive layer 204 extending along a surface of the thin film sensor stack 202, the conductive layer 204 lying on a common plane with the electrically insulating layer 210, wherein a thickness of the electrically insulating layer 210 is greater than a thickness of the conductive layer 204. Note that additional layers may be present.

In another embodiment, the second end of the thin film sensor stack 202 may be angled less than 90 degrees from a plane of deposition of the thin film sensor stack 202.

In another embodiment, the electrically insulating layer 210 may extend along at least about 20% of a stripe height of the thin film sensor stack 202 after processing is completed thereon including definition of the stripe height. In further embodiments, the electrically insulating layer 210 may extend along about 40% to about 80% of a stripe height of the thin film sensor stack 202 when processing is completed thereon (e.g., the sensor has been lapped about to the ABS).

Figure 3:
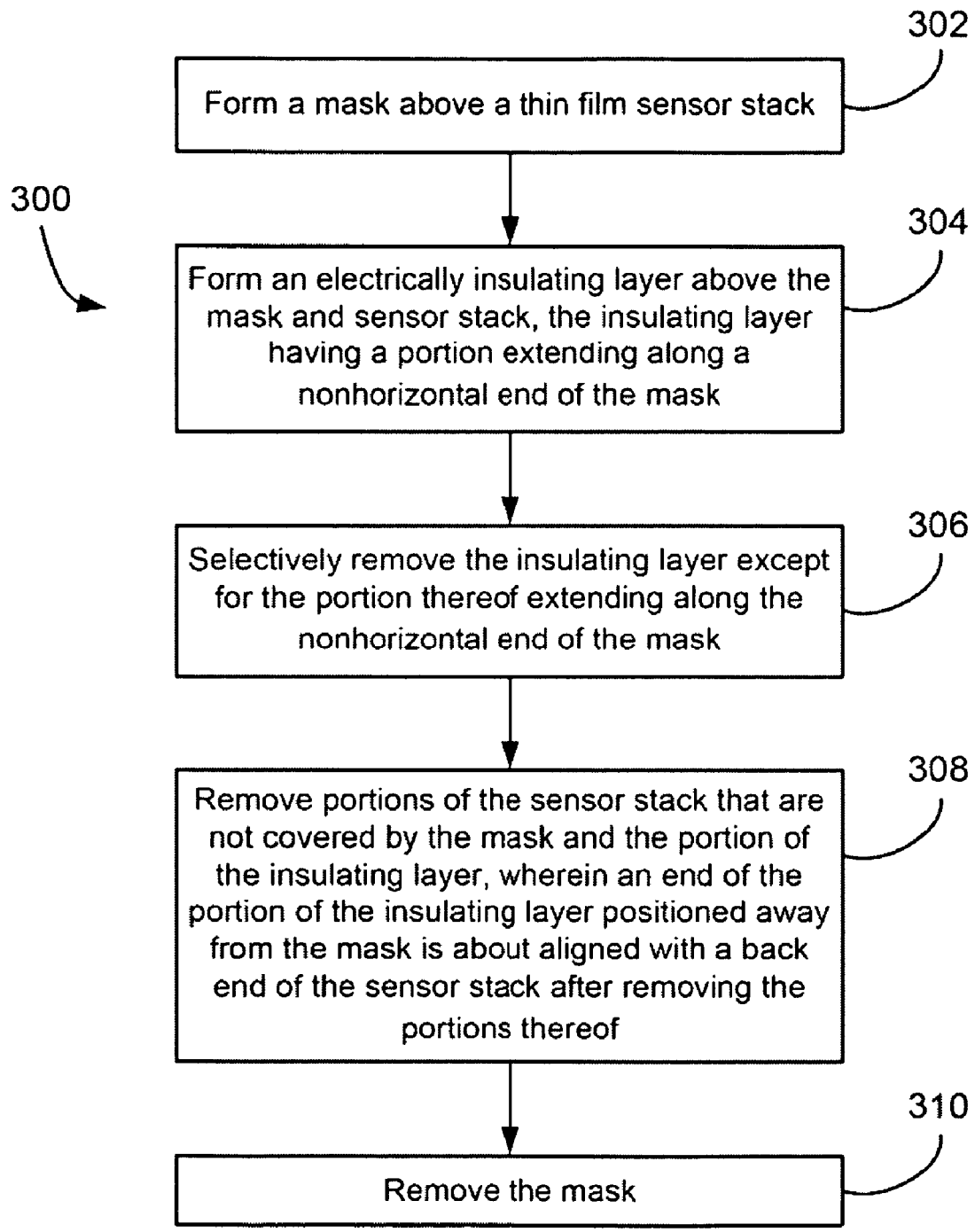
FIG. 3 is a flow diagram of a method according to one embodiment.

FIG. 3 illustrates a method 300 according to one embodiment. As an option the present method 300 may be implemented in the context of the functionality and architecture of FIGS. 1-2. Of course, the method 300 may be carried out in any desired environment. It should be noted that the aforementioned definitions may apply during the present description. Note that in this and other embodiments, standard processes known in the art may be used to form and define the various components.

With continued reference to FIG. 3, in operation 302, a mask is formed above a thin film sensor (sensor stack). Any technique suitable for depositing a mask may be used in operation 302 as commonly used techniques are acceptable.

In operation 304, an electrically insulating layer above the mask and sensor stack is formed, the insulating layer having a portion extending along a nonhorizontal end of the mask.

In operation 306, the insulating layer is selectively removed except for the portion thereof extending along the nonhorizontal end of the mask.

In operation 308, portions of the sensor stack that are not covered by the mask and the portion of the insulating layer are removed, wherein an end of the portion of the insulating layer positioned away from the mask is about aligned with a back end of the sensor stack after removing the portions thereof.

In operation 310, the mask is removed. Any technique suitable for removing a mask may be used in operation 310 as commonly used techniques are acceptable.

In one embodiment, the method 300 may further comprise forming a planarization stop layer (e.g., of diamond like carbon (DLC) or some other suitable material) prior to forming the mask; removing portions of the planarization stop layer not covered by the mask prior to forming the insulating layer;

filling a void created by removal of the portions of the sensor stack not covered by the mask with an insulating material; and planarizing a top of the portion of the insulating layer to be about coplanar with a top of the planarization stop layer. Also, the method 300 may further comprise forming a second planarization stop layer above the material filling the void.

In another embodiment, the sensor stack may include an electrically conductive cap layer, and the method 300 may further comprise removing a portion of the cap layer not covered by the mask prior to forming the insulating layer. Further, the method 300 may comprise forming a planarization stop layer of a suitable material (e.g., comprised of diamond like carbon (DLC)) between the cap layer and the mask; removing portions of the planarization stop layer not covered by the mask prior to forming the insulating layer; filling a void created by removal of the portions of the sensor stack not covered by the mask with an insulating material; planarizing a top of the portion of the insulating layer to be about coplanar with a top of the planarization stop layer, and removing the planarization stop layer. Thus, the thickness of the remaining portion of the insulating layer may be thicker than the cap layer in this embodiment.

In yet another embodiment, the method 300 may further comprise an operation for forming a shield above the sensor stack, as shown as upper shield layer 222 in FIG. 2K.

In another approach, the method 300 may further comprise an operation for forming the sensor stack.

In another approach, in operation 306, selectively removing the insulating layer except for the portion thereof extending along the nonhorizontal end of the mask includes milling.

In yet another approach, in operation 308, removing portions of the sensor stack that are not covered by the mask and the portion of the insulating layer includes milling.

In still another embodiment, in operation 308, portions of the sensor stack that are not covered by the mask and the portion of the insulating layer are removed, wherein an end of the sensor stack after removal of the portion thereof, and adjacent the portion of the sensor stack, is angled less than 90 degrees from a plane of deposition of the sensor stack.

In another approach, method 300 includes further processing for defining an air bearing surface, such as that shown in FIG. 2L. Note that this may include lapping, planarizing, addition of protective layers, etc.

In another embodiment of method 300, the electrically insulating layer is formed by atomic layer deposition.

In still another embodiment, in operation 308, the portion of the insulating layer that is not removed extends along at least about 20% of a stripe height of the sensor stack when processing is completed thereon including definition of the stripe height (e.g., the sensor stack is formed, the sensor's ABS has been lapped, etc.). Accordingly, the height of the conductive path between the overlying lead structure (e.g., cap, shield, etc.) and the sensor stack is less than about 80%, and is preferably positioned towards the ABS of the completed sensor.

In another approach, in operation 308, portions of the sensor stack that are not covered by the mask and the portion of the insulating layer are removed, wherein the portion of the insulating layer extends along about 40% to about 80% of a stripe height of the sensor stack when processing is completed thereon including definition of the stripe height. In other embodiments, the portion of the insulating layer extends along about 60% to about 80% of a stripe height of the completed sensor stack.

Figure 4:
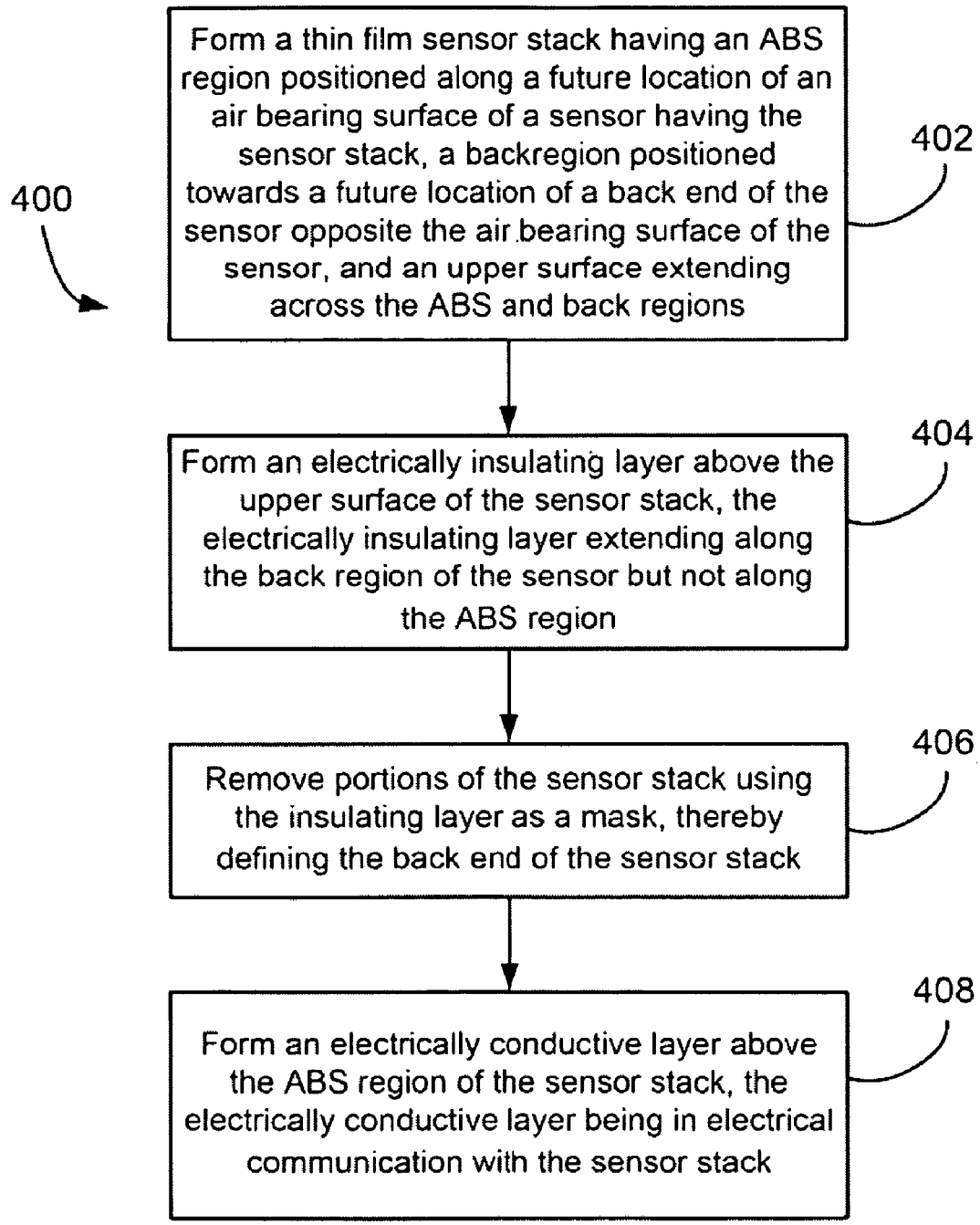
FIG. 4 is a flow diagram of a method according to one embodiment.

FIG. 4 illustrates a method 400 according to one embodiment. As an option the present method 400 may be implemented in the context of the functionality and architecture of FIGS. 1-2. Of course, the method 400 may be carried out in any desired environment. It should be noted that the aforementioned definitions may apply during the present description. Note that in this and other embodiments, standard processes known in the art may be used to form and define the various components. Any technique suitable for depositing layers may be used in the following operations as commonly used techniques are acceptable.

With continued reference to FIG. 4, in operation 402, three components are formed: a thin film sensor stack having an ABS region positioned along a future location of an air bearing surface of a sensor having the sensor stack, a backregion positioned towards a future location of a back end of the sensor opposite the air bearing surface of the sensor, and an upper surface extending across the ABS and back regions.

In operation 404, an electrically insulating layer above the upper surface of the sensor stack is formed, the electrically insulating layer extending along the back region of the sensor but not along the ABS region.

In operation 406, portions of the sensor stack are removed using the insulating layer as a mask, thereby defining the back end of the sensor stack.

In operation 408, an electrically conductive layer above the ABS region of the sensor stack is formed, the electrically conductive layer being in electrical communication with the sensor stack.

In one approach, the sensor stack includes an electrically conductive cap layer, and operation 402 further comprises removing a portion of the cap layer prior to forming the insulating layer. In another approach, operation 402 further comprises forming a shield above the sensor stack.

In another approach, in operation 406, an end of the sensor stack after removal of the portions thereof, and adjacent the portion of the sensor stack, is angled less than 90 degrees from a plane of deposition of the sensor stack.

In another preferred approach, operation 408 further comprises performing processing for defining an ABS. Note that this may include lapping, planarizing, addition of protective layers, etc.

In yet another approach, in operation 404, an electrically insulating layer above the upper surface of the sensor stack is formed, the electrically insulating layer extending along at least about 20% of a stripe height of the sensor stack when processing is completed thereon including definition of the stripe height (e.g., the sensor stack is done, the sensor's ABS has been lapped, etc.). Accordingly, the height of the conductive path between the overlying lead stricture (e.g., cap, shield, etc.) and the sensor stack is less than about 80%, and is preferably positioned towards the ABS of the completed sensor.

In a further approach, in operation 404, an electrically insulating layer above the upper surface of the sensor stack is formed, the electrically insulating layer extending along about 40% to about 80% of a stripe height of the sensor stack when processing is completed thereon including definition of the stripe height. In other approaches, the portion of the insulating layer extends along about 60% to about 80% of a stripe height of the completed sensor stack.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
forming a mask above a thin film sensor stack;
forming an electrically insulating layer above the mask and sensor stack, the insulating layer having a portion extending along a nonhorizontal end of the mask;
selectively removing the insulating layer except for the portion thereof extending along the nonhorizontal end of the mask;
removing portions of the sensor stack that are not covered by the mask and the portion of the insulating layer, wherein an end of the portion of the insulating layer positioned away from the mask is about aligned with a back end of the sensor stack after removing the portions thereof; and
removing the mask.

2. The method of claim 1, further comprising:
forming a planarization stop layer prior to forming the mask;
removing portions of the planarization stop layer not covered by the mask prior to forming the insulating layer;
filling a void created by removal of the portions of the sensor stack not covered by the mask with an insulating material; and
planarizing a top of the portion of the insulating layer to be about coplanar with a top of the planarization stop layer.

3. The method of claim 2, further comprising forming a second planarization stop layer above the insulating material filling the void.

4. The method of claim 1, wherein the sensor stack includes an electrically conductive cap layer, and further comprising removing a portion of the cap layer not covered by the mask prior to forming the insulating layer.

5. The method of claim 4, further comprising:
forming a planarization stop layer between the cap layer and the mask;
removing portions of the planarization stop layer not covered by the mask prior to forming the insulating layer;
filling a void created by removal of the portions of the sensor stack not covered by the mask with an insulating material;
planarizing a top of the portion of the insulating layer to be about coplanar with a top of the planarization stop layer; and
removing the planarization stop layer.

6. The method of claim 1, further comprising forming a shield above the sensor stack.

7. The method of claim 1, wherein, the sensor stack is formed prior to forming the mask above a thin film sensor stack.

8. The method of claim 1, wherein selectively removing the insulating layer except for the portion includes milling.

9. The method of claim 1, wherein removing the portions of the sensor stack that are not covered by the mask and the portion of the insulating layer includes milling.

10. The method of claim 1, wherein an end of the sensor stack after removal of the portions thereof, and adjacent the portion of the sensor stack, is angled less than 90 degrees from a plane of deposition of the sensor stack.

11. The method of claim 1, further comprising defining an air bearing surface.

12. The method of claim 1, wherein the electrically insulating layer is formed by atomic layer deposition.

13. The method of claim 1, wherein the portion of the insulating layer extends along at least about 20% of a stripe height of the sensor stack when processing is completed thereon including definition of the stripe height.

14. The method of claim 1, wherein the portion of the insulating layer extends along about 40% to about 80% of a stripe height of the sensor stack when processing is completed thereon including definition of the stripe height.

* * * * *

UNITED STATES PATENT AND TRADEMARK OFFICE
CERTIFICATE OF CORRECTION

| | | |
|---|---|---|
| PATENT NO. | : 8,225,487 B2 | Page 1 of 1 |
| APPLICATION NO. | : 12/180313 | |
| DATED | : July 24, 2012 | |
| INVENTOR(S) | : Hong et al. | |

It is certified that error appears in the above-identified patent and that said Letters Patent is hereby corrected as shown below:

Col. 8, line 49 replace "stricture" with --structure--.

Signed and Sealed this
Twenty-fifth Day of September, 2012

David J. Kappos
*Director of the United States Patent and Trademark Office*